(12) United States Patent
McKay et al.

(10) Patent No.: US 9,796,134 B2
(45) Date of Patent: Oct. 24, 2017

(54) SYSTEMS AND METHODS FOR JOINING A WARPED WORKPIECE TO ANOTHER WORKPIECE

(71) Applicant: GM GLOBAL TECHNOLOGY OPERATIONS LLC, Detroit, MI (US)

(72) Inventors: Neil David McKay, Chelsa, MI (US); Pei-Chung Wang, Troy, MI (US); Dalong Gao, Rochester, MI (US); Bradley J. Blaski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 322 days.

(21) Appl. No.: 14/667,974

(22) Filed: Mar. 25, 2015

(65) Prior Publication Data

US 2016/0279859 A1    Sep. 29, 2016

(51) Int. Cl.
*B32B 37/00* (2006.01)
*B29C 65/08* (2006.01)
*B29C 65/00* (2006.01)

(52) U.S. Cl.
CPC ............ *B29C 65/08* (2013.01); *B29C 65/081* (2013.01); *B29C 66/112* (2013.01); *B29C 66/131* (2013.01); *B29C 66/8163* (2013.01); *B29C 66/83221* (2013.01); *B29C 66/863* (2013.01); *B29C 66/92445* (2013.01); *B29C 66/9672* (2013.01); *B29C 66/71* (2013.01); *B29C 66/721* (2013.01); *B29C 66/7212* (2013.01); *B29K 2995/0056* (2013.01)

(58) Field of Classification Search
CPC ..... B29C 65/08; B29C 65/081; B29C 66/112; B29C 66/131; B29C 66/8163; B29C 66/83211; B29C 66/863; B29C 66/92445; B29C 66/9672
USPC .............................................. 156/73.1, 580.1
See application file for complete search history.

(56) References Cited

U.S. PATENT DOCUMENTS

| 7,793,815 B2 * | 9/2010 | Shimizu | B23K 20/10 |
| | | | 156/73.1 |
| 8,376,016 B2 * | 2/2013 | Hull | B29C 65/08 |
| | | | 156/580.1 |
| 8,591,679 B1 * | 11/2013 | Hull | 156/580.1 |

\* cited by examiner

*Primary Examiner* — James Sells
(74) *Attorney, Agent, or Firm* — Mickki D. Murray; Parks IP Law LLC

(57) ABSTRACT

The present disclosure relates to methods by which a warped workpiece is reconfigured in a pre-determined manner to reduce a separation between the warped workpiece and a joining workpiece. The warped workpiece is reformed/reshaped, prior to joining, by softening material of the warped workpiece through application of a predetermined amount of energy at or near warping and using a directional force applied to a first surface of the warped workpiece, thus reducing a separation space at a joining interface of the warped workpiece and joining workpiece.

15 Claims, 3 Drawing Sheets

Fig_3

Fig_4

SYSTEMS AND METHODS FOR JOINING A WARPED WORKPIECE TO ANOTHER WORKPIECE

TECHNICAL FIELD

The present technology relates generally to connecting workpieces by welding. More specifically, the present technology relates to systems and methods for welding workpieces when one of the workpieces is deformed.

BACKGROUND

Ultrasonic welding is an industrial technique whereby high-frequency ultrasonic acoustic vibrations are locally applied to workpieces being held together under pressure to create a fusion weld. This technique is commonly used for joining similar and dissimilar plastics. The technique is used in industries such as automotive, appliance, electronic, packaging, textile, and medical, among others.

During ultrasonic welding, alignment and leveling of a welding fixture, a welding horn, and the workpieces are important. As an example, when the welding horn is not positioned generally perpendicular to a workpiece, discrepancies in the weld may occur, such as under-welding, and non-uniformity of the weld, among others. Warping or deformation within a workpiece can cause the welding horn to be positioned undesirably with respect to a workpiece, e.g., not perpendicular to the workpiece, during joining, causing discrepancies in the weld.

When the warped workpiece is positioned near a second, joining workpiece for joining, an undesired space is present between the warped workpiece and the joining workpiece. The space between the warped workpiece and the joining workpiece can lead to less-than-ideal weld formation as well.

SUMMARY

The need exists for systems and methods to align a welding tip generally perpendicular to a warped workpiece for joining the warped workpiece with a second, or joining, workpiece. The systems and methods would reduce or eliminate a space formed between the warped workpiece and the joining workpiece prior to or during joining.

According to the present technology, a warped workpiece would be generally reformed in a pre-determined manner to reduce a separation present when a second surface of the warped workpiece is positioned against a first surface of the joining workpiece. The first workpiece may be, for instance, a top workpiece, having an upper first surface opposite a lower second surface for positioning adjacent an upper first surface of a second, or joining, workpiece. While the process can be performed in various ways, affect the warped workpiece in various ways, and include processes such as reforming, reshaping, and reconfiguring, to simplify the description, the process is referred to primarily herein as reforming the workpiece. The warped workpiece is in some embodiments reformed, prior to joining, using directional force applied to a first surface of the warped workpiece.

In some embodiments, more than one workpiece may have warping or deformity. The process of reforming each workpiece may be performed a pre-determined manner to reduce separation present between the workpieces to be joined.

In some embodiments, directional force can instead or additionally be applied to a second surface of a joining workpiece, where the second surface is opposite the first surface of the joining workpiece which is to be joined with the second surface of the warped workpiece.

In some embodiments, the warped workpiece is reformed through positioning facilitated by use of a surface disposition sensing device, such as a laser scanner, which finds and/or tracks surfaces during joining to maintain a position of the weld horn that is generally perpendicular in relation to the warped workpiece. Laser scanning includes components such as a camera and a beam generator. Such devices are used to adequately identify portions of the warped workpiece that need to be reformed prior to or during joining.

In some embodiments, the camera is used with a controller, which executes programs based on a defined welding task. The camera captures characteristics of the warped workpiece, using sensors to capture light, and communicates the characteristics as data to the controller. The controller processes the data into an image of the warped workpiece and executes instructions to adjust the weld horn to a position perpendicular the warped workpiece joining.

In some embodiments, the warped workpiece is reformed using a positioning device, which aligns the weld horn with the warped workpiece. The positioning device uses translational and rotational components to position the weld horn generally perpendicular to the warped workpiece.

In some embodiments, the warped workpiece is reformed by using the weld horn to soften material of the warped workpiece, which can be referred to as heat softening. Once material of (e.g., within) the warped workpiece is softened, directional force is applied to the warped workpiece. The force applied to the softened workpiece causes it to reshape, away from the warped shape, to reduce separation formed by positioning the warped workpiece against a joining workpiece.

Other aspects of the present disclosure will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

I. OVERVIEW OF THE DISCLOSURE—FIGS. 1 THROUGH 3

While the descriptions herein focus primarily on a scenario wherein one of the two workpieces is warped, at least one surface, the technology is also helpful in situations in which more than one surface of first workpiece exhibits any deformity, or misshaping, or when at least one surface of both workpieces being joined has flawed shaping. Such warping and deformity may result from, for example, shrinkage of the warped workpiece due to temperature variation, such as when the warped workpiece is exposed to temperature outside of a pre-determined manufacturing tolerance.

While ultrasonic welding is described as a primary example, herein, the technology be used in connection with other types of welding without departing from the scope of the present disclosure.

Figure 1:
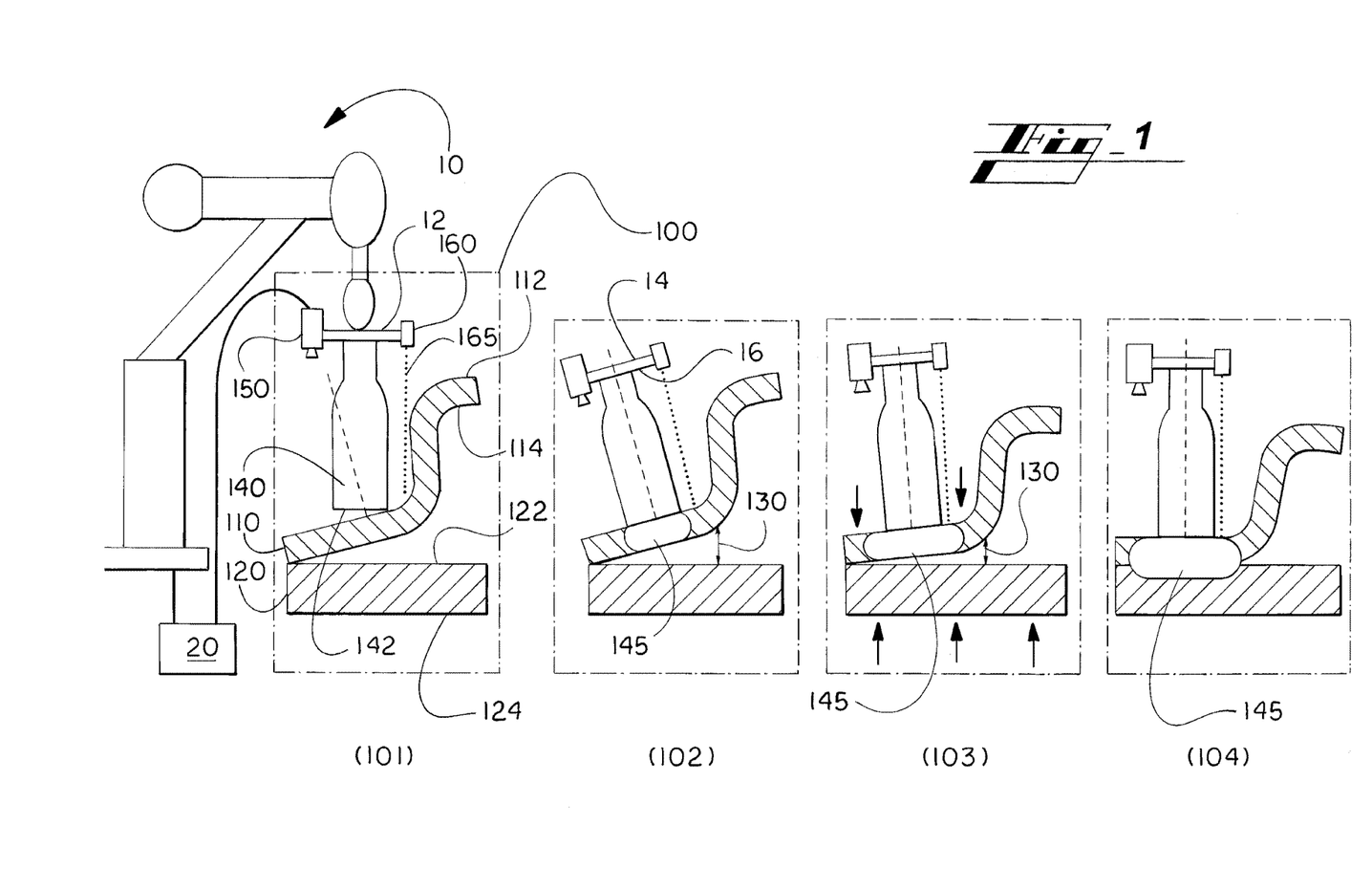
FIG. 1 illustrates schematically a positioning system in accordance with an exemplary embodiment.

Now turning to the figures, and more particularly to the first figure, FIG. 1 shows a joining system 100 in connection with a robot 10 or other automated device. The robot 10 and the joining system 100 receive instructions from a controller 20.

The joining system 100 is used to align a first workpiece 110 having warping within its material structure (hereinafter the warped workpiece 110), with a second workpiece 120 (hereinafter the joining workpiece 120) for being joined, by ultrasonic welding for example.

The warped workpiece 110 includes a first surface 112 and a second surface 114, opposite the first surface 112 of the warped workpiece 110. Similarly, the joining workpiece 120 includes a first surface 122 and a second surface 124, opposite the first surface 122 of the joining workpiece 120.

A weld is formed by the second surface 114 of the warped workpiece 110 joining with the first surface 122 of the joining workpiece 120. Interface of the second surface 114 of the warped workpiece 110 and the first surface 122 of the joining workpiece 120 forms a joining interface (e.g., faying interface) during welding.

The warped workpiece 110 is a pre-fabricated workpiece that, when put in contact with the joining workpiece 120, does not meet the joining workpiece 120 fully as desired. For instance, the second surface 114 of the warped workpiece 110 does not contact the first surface 122 of the joining workpiece 120 in a consistent manner as needed for a proper weld to be formed at the interface. More specifically, for example, curvature or other warping or deformity may prevent the second surface 114 of the warped workpiece 110 from being generally parallel to, or flush with, the first surface 122 of the joining workpiece 120.

The warped workpiece 110 and the joining workpiece 120 may be similar in material structure. For example, the warped workpiece 110 and the joining workpiece 120 may both be composed of a polymer composite material. Conversely, the warped workpiece 110 can be of a different material than the joining workpiece 120.

In some embodiments, one or more of the workpieces 110, 120 may include but are not limited to polymers such as (functionalized) polycarbonate, polyolefin (e.g., polyethylene and polypropylene), polyamide (e.g., nylons), polyacrylate, or acrylonitrile butadiene styrene.

In other embodiments, one or more of the workpieces 110, 120 may include, but are not limited to, composites. For example, in one embodiment one or both of the workpieces 110, 120 includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite (e.g., plastic composite containing metal reinforcing fibers). The material in some implementations includes a polyamide-grade polymer, which can be referred to generally as a polyamide. In one embodiment, the material of one or both of the workpieces 110, 120 includes acrylonitrile-butadiene-styrene (ABS). In one embodiment, the material of one or both of the workpieces 110, 120 includes a polycarbonate (PC).

Material of one or both of the workpieces 110, 120 may also comprise a type of resin. Example resins include a fiberglass reinforced polypropylene (PP) resin, a PC/PBT resin, and a PC/ABS resin.

At least one of the workpieces 110, 120 can include synthetic, or inorganic, molecules. While use of so-called biopolymers (or, green polymers) is increasing, petroleum-based polymers are still much more common. Material of one or both of the workpieces 110, 120 may also include recycled material, such as a polybutylene terephthalate (PBT) polymer, which is about eighty-five percent post-consumer polyethylene terephthalate (PET). In one embodiment, one or both of the workpieces 110, 120 includes some sort of plastic. In one embodiment, the material includes a thermoplastic.

Figure 2:
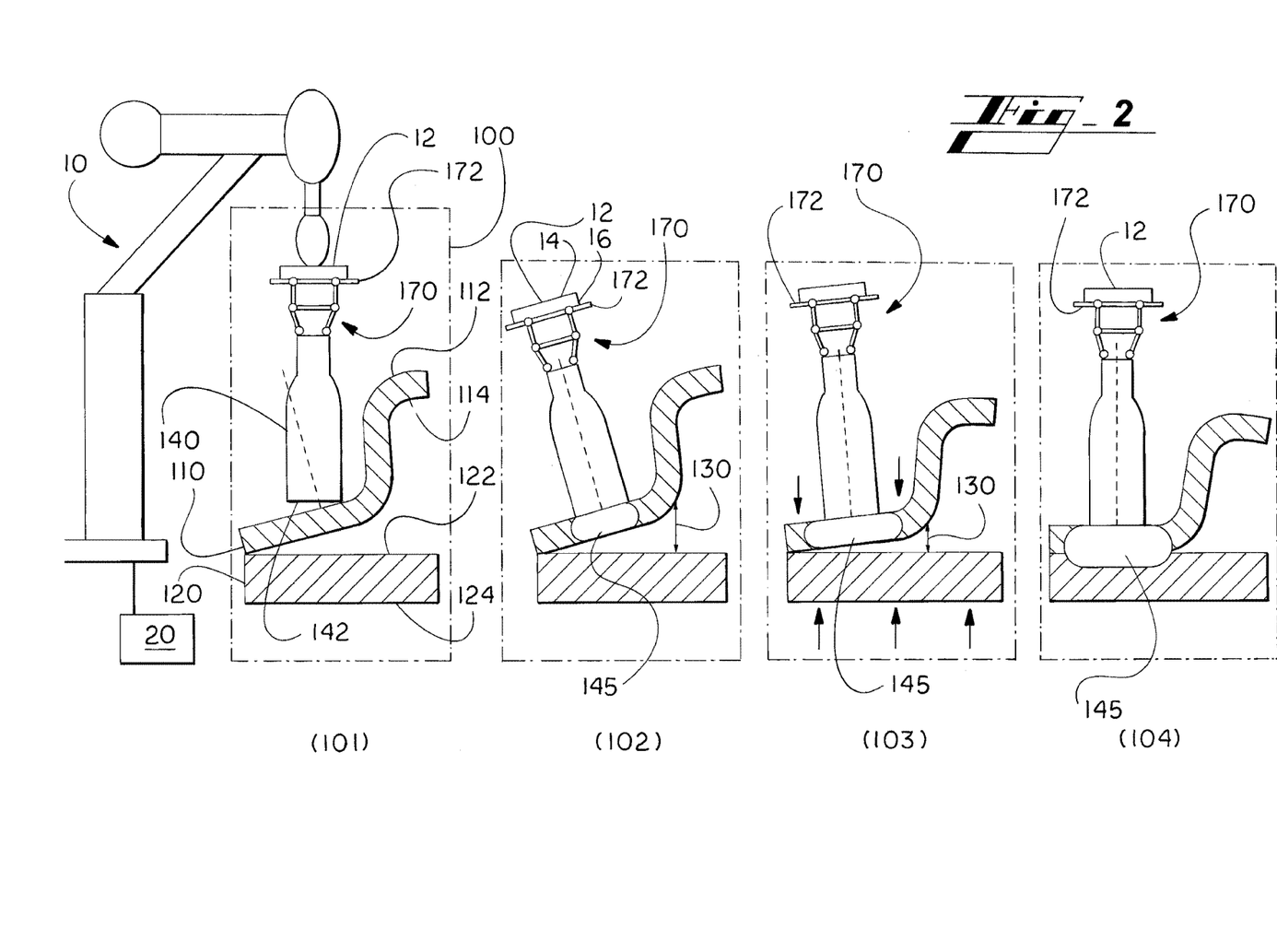
FIG. 2 is an alternate embodiment of the positioning system of FIG. 1.

At position 101 in FIGS. 1 and 2, in some embodiments, the weld horn 140 at least partially comes in contact with the first surface 112 of the warped workpiece 110. However, at position 101 the edge or tip 142 of the weld horn 140 (referred to in a non-limiting manner and for simplicity as the tip) is not positioned perpendicular to the first surface 112 of the warped workpiece 110 (the perpendicular position to the target weld surface being illustrated by a dashed line through the weld horn 140). As discussed above, when the tip 142 of the weld horn 140 is kept non-perpendicular to the first surface 112 of the warped workpiece, improper weld formation between the workpieces 110, 120 can occur. In a contemplated embodiment involving laser, or another electronic-based sensing system, the horn 140 is adjusted toward the perpendicular position prior to and/or after the tip 142 contacts the proximate workpiece 110.

Alignment of the tip 142 of the weld horn 140 with the first surface 112 of the warped workpiece 110 can be accomplished using any system, apparatus, device, or method that positions the weld horn 140 generally perpendicular to the first surface 112 of the warped workpiece 110—i.e., aligning the horn 140 with the workpiece 110. Aligning can include, for example, a scanning alignment (illustrated in FIG. 1) or a positioning alignment (illustrated in FIG. 2), discussed in detail below.

At position 102 in FIGS. 1 and 2, the weld horn 140, after being adjusted to be perpendicular to the surface 112, can contact the first surface 112 of the warped workpiece 110, at an energy transfer area 145. The energy transfer area 145 is initially formed by a contact area between the tip 142 of the weld horn 140 and the first surface 112 of the warped workpiece 110.

As illustrated in FIGS. 1 and 2, the warped workpiece 110 is separated initially from the joining workpiece 120 by a space 130. In traditional ultrasonic processes, the weld horn 140 is moved toward the proximate workpiece (warped workpiece 110) in a pre-set manner, which would be perpendicular to the proximate surface (first surface 112) if the proximate surface was properly shaped. For example, the horn 140 is lowered in a vertical manner by the robot 10, but the horn 140 is not aligned perpendicular with the first surface 112 when the surface 112 is warped. Perpendicular alignment of the weld horn 140 with the warped workpiece 110 creates more ideal welding conditions.

Unlike traditional ultrasonic processes, the joining system 100 positions the weld horn 140 generally perpendicular to the warped workpiece 110, which increases contact between the horn 140 and the workpiece 110, allowing more ultrasonic energy from the weld horn 140 to be applied to the workpiece 110 and so transmitted more, and more consistently, across an area of material of the warped workpiece 110. Positioning the weld horn 140 generally perpendicular to the warped workpiece 110, allows the weld horn 140 to deliver ultrasonic energy more directly, or robustly, to the warped workpiece 110 and joining workpiece 120.

When the weld horn 140 is not perpendicular to the warped workpiece 110, significant amounts of ultrasonic energy (e.g., sound carried by ultrasonic waves) reflects from the first surface 112 of the warped workpiece 110 rather than being transmitted into the warped workpiece 110. Consequently, transmission of the ultrasonic energy would be reduced, potentially resulting in a discrepant weld or undersized weld. Reforming the warped workpiece 110 so that the second surface 114 of the warped workpiece 110 is parallel, or at least more parallel or flush, with the joining workpiece 120 allows better weld formation, wherein the weld is formed more consistently throughout a welding area.

At position 103 in FIGS. 1 and 2, directional force (illustrated as arrows) is applied to the first surface 112 of the warped workpiece 110 and the second surface 124 of the joining workpiece 120, thereby pushing the workpieces 110, 120 toward each other. In some embodiments, directional force is applied as a clamping force.

In some embodiments, the warped workpiece 110 is softened using heat, produced as a result of ultrasonic vibrations from the weld horn 140 before and/or during application of direction force. This process, which may be referred to as heat softening, allows material within the warped workpiece 110 to soften for reformation to a shape more suitable for welding with the joining workpiece 120. As a result of heat softening and/or directional force, the space 130 located between the second surface 114 of the warped workpiece 110 and the first surface 122 of the joining workpiece 120 is thereby reduced if not completely eliminated.

Figure 4:
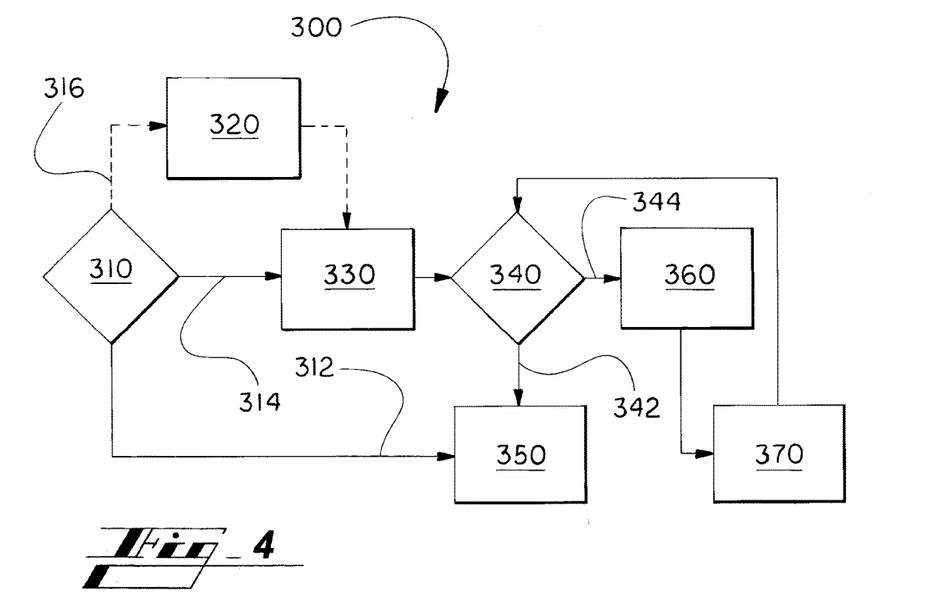
FIG. 4 is a flow chart illustrating an aligning sequence performed by the controller in FIG. 3.

Further details associated with the process of making the second surface 114 of the warped workpiece 110 more parallel, or flush with the first surface 122 of the joining workpiece 120 is discussed in association with FIG. 4.

In some embodiments, during reforming, ultrasonic energy, produced from the weld horn 140, creates a high-frequency vibration (e.g., 10 kHz or greater) that changes the molecular structure of the warped workpiece 110. This vibration energy is changed to heat through intermolecular friction that softens material within the warped workpiece 110. The ultrasonic energy transmitted from the weld horn 140 can be initially applied at any location on the first surface 122 of the warped workpiece 120 at or near warping or a deformity of the material of the warped workpiece 110.

As the high-frequency vibrations continue, a size of the energy transfer area 145 continues to expand as illustrated between position 102 and position 103 in FIGS. 1 and 2. With the energy transfer area 145 expanding, the material softening within the warped workpiece 110, and the force pushing the workpieces 110, 120 toward each other, the warped workpiece 110 is reformed, allowing the second surface 114 of the warped workpiece 110 to become generally parallel, or flush, with the first surface 122 of the joining workpiece 120, at least at or adjacent the energy transfer area 145, as shown in position 104.

Ultimately, the energy transfer area 145 expands through some or all of the warped workpiece 110 and into the joining workpiece 120, as illustrated at position 104 in FIGS. 1 and 2. In FIGS. 1 and 2, the energy transfer area 145 has expanded causing softening through additional material within the warped workpiece 110 and the joining workpiece 120. Ultimately, the energy transfer area 145 expands to form a weld at the joining interface (e.g., faying interface) between the warped workpiece 110 and the joining workpiece 120. The energy transfer area 145 would not transfer to the joining workpiece 120, or at least not to as great an extent, if the warped workpiece 110 were not reformed to increase contact between the warped workpiece 110 and joining workpiece 120 as described.

While ultrasonic vibrations is described as a primary example for heat softening, the technology can be used in connection with other heating methods without departing from the scope of the present disclosure. For example, heat softening of material of the warped workpiece 110 may occur through heating methods such as infrared radiation or laser emission. The heating method used for heat softening of the warped workpiece 110 may be specific to the application for which joining is required.

In some embodiments, the weld horn 140 is attached to and moved by the robot 10. The robot 10 can be programmed (e.g., by programming of the controller 20) to maneuver the weld horn 140 allowing softening and welding of one or more sections within the warped workpiece 110. Ultrasonic welding benefits from precise positioning of the weld horn 140 that the robot 10 can provide by way of the controller 20.

The robot 10 can include components performing spatial sensing, such as in a process that can be referred to as visual intelligence. Components such as infrared sensors, shock sensors, camera assemblies, vision processors, and other components associated with spatial sensing. For example, a shock sensor can inform the robot 10 that it has collided with an unintended object and terminate a robot control program, or revise a sequence within the program so that the robot does not revisit a location of the collision.

Figure 3:
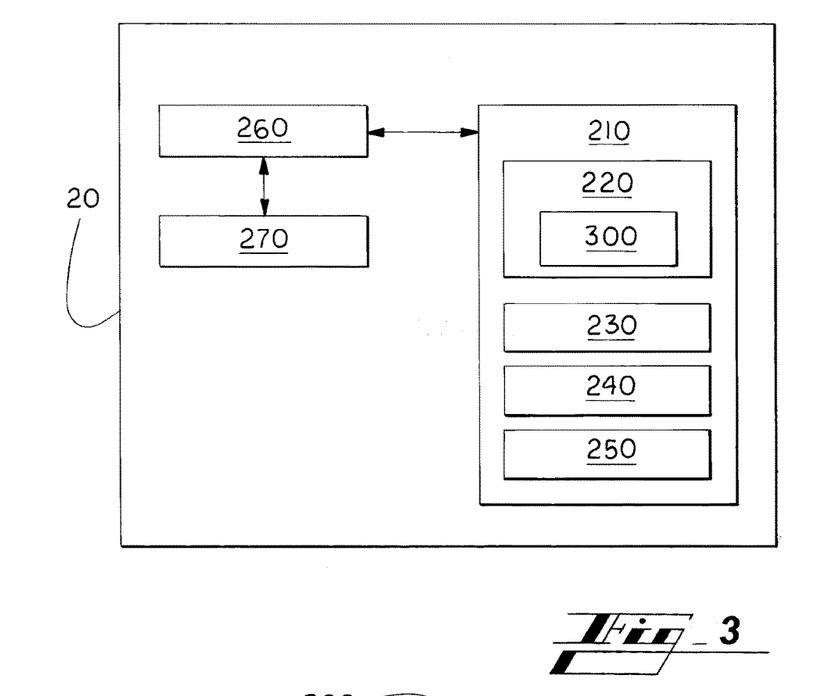
FIG. 3 is a block diagram of a controller for use in connection with the positioning system in FIGS. 1 and 2.

FIG. 3 illustrates the controller 20, which is an adjustable hardware that in various embodiments, stores and processes computer-executable instructions. The controller 20 is configured to be in communication with the robot 10 (e.g., using control signals). In some embodiments, the controller 20 is configured to be in communication with the camera 150 (FIG. 1), for receiving feedback from and/or controlling functions of the camera 150.

The controller 20 may be a microcontroller, microprocessor, programmable logic controller (PLC), complex programmable logic device (CPLD), field-programmable gate array (FPGA), or the like. The controller may be developed through the use of code libraries, static analysis tools, software, hardware, firmware, or the like. Any use of hardware or firmware includes a degree of flexibility and high-performance available from an FPGA, combining the benefits of single-purpose and general-purpose systems.

The controller 20 includes a memory 210 comprising hardware and software. The memory 210 may include several categories of software and data used in the controller 20, including, applications 220, a database 230, an operating system (OS) 240, and I/O device drivers 250.

As will be appreciated by those skilled in the art, the OS 240 may be any operating system for use with a data processing system. The I/O device drivers 250 may include various routines accessed through the OS 240 by the applications 220 to communicate with devices and certain memory components.

The applications 220 can be stored in the memory 210 and/or in a firmware (not shown) as executable instructions and can be executed by a processor 260. The applications 220 include various programs, such as an aligning sequence 300 (shown in FIG. 4) described below that, when executed by the processor 260.

The applications 220 may be applied to data stored in the database 230, such as defined motions/positions of the robot 10 and data from the camera 150, e.g., received via the I/O data ports 270. The database 230 represents the static and dynamic data used by the applications 220, the OS 240, the I/O device drivers 250 and other software programs that may reside in the memory 210.

While the memory 210 is illustrated as residing proximate to the processor 260, it should be understood that at least a portion of the memory 210 can be a remotely accessed storage system, for example, a server on a communication network, a remote hard disk drive, a removable storage medium, combinations thereof, and the like. Thus, any of the data, applications, and/or software described above can be stored within the memory 210 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure can also be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations including single-processor or multiprocessor systems, minicomputers, mainframe computers, personal computers, hand-held computing devices, microprocessor-based, programmable consumer electronics, combinations thereof, and the like.

II. EMBODIMENTS OF THE POSITIONING SYSTEM—FIGS. 1 AND 2

The joining system 100 can include or be used with any of a wide variety of aligning devices, components, or structures to properly position the weld horn 140. The aligning devices and structures should adjust themselves to a desired position, either mechanically or by automated machinery, such as that executing software to control the robot 10. For example, the aligning structure can include a laser scanning device as illustrated in FIG. 1, or a mechanical positioning device as illustrated in FIG. 2.

FIG. 1 illustrates an exemplary embodiment of the joining system 100 using laser scanning to find and/or track surfaces during aligning and/or joining to maintain proper position of the weld horn 140 in relation to the warped workpiece 110 (e.g., generally perpendicular to the workpiece).

Components such as, but not limited to, a visualization component 150 may be used to adequately identify and adjust warping of the warped workpiece 110. Specifically, the visualization component 150 may be in communication with the controller 20 (as illustrated in FIG. 1) to communicate data perceived by the visualization component 150 identifying warping of at least the first surface 112 of the workpiece 110. The controller 20 conduct functions such as execution of a program or sub-program based on a defined welding task.

While the visualization component 150 is described primarily herein as a camera, the visualization component 150 can include any one or more of a wide variety of components providing visualizing input to the robot, allowing, e.g., for robot visualization. Example visualization components 150 include, but are not limited to, sensors (e.g., cameras or pressure sensors), lasers, and radars, are configured to be used to identify position and/or orientation of a workpiece prior to or during welding of the joining interface. Reference to the visualization component as a camera 150 in the specification is intended to cover such component(s).

During conventional joining, cameras can capture and communicate data that determines conformance of the workpiece against a predetermined set of parameters, such as weld defects (e.g., porosity or cracks). Additionally, the cameras can be used to verify, for example, whether a workpiece meets code requirements (e.g., go/no-go situation), to correlate weld measurements to predefined data (e.g., tolerances housed within controller software).

In operation, the camera 150, using one or more sensors, captures characteristics of the first surface 112 of the warped workpiece 110 such as warping or deformity. For example, characteristics may be captured in the form of light reflected off the first surface 112 of the warped workpiece 110.

The camera 150 communicates captured characteristics as data (characteristics data) to the controller 20. The controller 20 processes the characteristics data into an image of the first surface 112 of the warped workpiece 110 and executes instructions to, using the robot 10, adjust the weld horn 140 to be perpendicular to the first surface 112 of the warped workpiece 110 for joining.

In some embodiments, a lower-power laser beam 165, produced from a beam generator 160, for example, projects light that reflects off the first surface 112 of the warped workpiece 110. Light from the laser beam 165 translates toward the camera 150 as characteristics data. From there, the controller 20 converts the characteristics data into the image of the first surface 112 of the warped workpiece 110 that can be used for joint tracking or weld inspection purposes.

A platform 12 is configured to connect with an aligning device, which aligns and positions the weld horn 140 to be generally perpendicular to the first surface 112 of the warped workpiece 110. The platform 12 contains a first surface 14 configured to attach to a portion of the robot 10 (e.g., robot arm) and one or more second surfaces 16, configured to attach to components that assist in aligning the weld horn 140 perpendicular to the first surface 112 of the warped workpiece 110.

For example, the platform 12 may connect the second surface(s) 16 with a visualization device (e.g., camera 150), or a laser device (e.g., beam generator 160), among others, as illustrated in FIG. 1. Where the camera 150 and the beam generator 160 are used, the first surface of the platform 12 attaches to the robot 10, a second surface at an angle from the first surface of the platform 12 is configured to position the camera 150, and a third surface at an angle from the first surface of the platform is configured to position the laser generator 160. In some embodiments, the camera 150 and the laser generator 160 may be positioned on the same surface (e.g., where the camera 150 includes a laser generator 160).

FIG. 2 illustrates another exemplary embodiment of the joining system 100. The system 100 of FIG. 2 includes a positioning device 170 to position the weld horn 140 generally perpendicular to the warped workpiece 110 during aligning and/or joining. The positioning device 170 is one or more mechanical devices or components that provide a translation (x, y, z) as well as a rotation (x, y, z) providing six degrees of freedom to align the weld horn 140 perpendicular to the first surface 112 of the warped workpiece 110.

Translation allows the positioning device 170 to move on a lateral plane forward and backward (along an x-axis), left and right (along a y-axis), and/or up and down (along a z-axis). Rotation, additionally or alternatively, allows the positioning device 170 to rotate about the x-axis, y-axis, and/or z-axis to allow the positioning device 170 to align perpendicular to the first surface 112 of the warped workpiece 110. The translational and/or rotational components of the positioning device 170 may position the weld horn 140 using mechanical means such as hinges, springs, coils, bearings, and the like.

The platform 12 may be configured to connect to the positioning device 170, as illustrated in FIG. 2. Where the positioning device 170 is used, the first surface 14 of the platform 12 attaches to the robot 10, a second surface 16 of the platform 12 is opposite the first surface 14 and configured to attach to a faceplate 172 of the positioning device 170, thus connecting the positioning device 170 to the robot 10 for use during positioning, reforming, and/or joining the workpieces 110, 120.

The faceplate 172 connects to the second surface 16 of the platform 12 in order to adjust the positioning device 170, and thus the weld horn 140, to a position perpendicular to the first surface 112 of the warped workpiece 110. The faceplate 172 may be used independently, as a means of connecting the positioning device 170 to the robot 10, or in conjunction with components of the positioning device 170 that assist in alignment of the weld horn 140 perpendicular to the first surface 112 of the warped workpiece 110. In some embodiments, the faceplate 172 is not present and a portion the positioning device 170 would be connectable with a portion of the robot 10.

Also, the platform 12 may be configured to adjust with the positioning device 170 during adjusting of the weld horn 140 generally perpendicular to the first surface 112 warped workpiece 110 as material of the warped workpiece 110 softens and reforms to a location generally parallel to the joining workpiece 120.

The system 100 can include one or more other devices and components within the system 100 or in support of the system 100. For example, multiple controllers may be used to produce adjustment of the weld horn 140, if necessary, using instructions to the robot 10 for example.

III. METHODS OF OPERATION—FIG. 4

FIG. 4 is a flow chart illustrating methods for performing a positioning and welding sequence 300, whereby the second surface 114 of the warped workpiece 110 is made to be more parallel, or flush with the first surface 122 of the joining workpiece 120.

It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

Software may be engaged by controller actions (e.g., using a start program) performed by the processor 260 to commission the sequence 300. The sequence 300 may be executed by the controller 20 according to any of various timing protocols, such as continuously or almost continuously, or at specific time intervals (e.g., every second), for example. Alternatively, the start program may be executed based on occurrence of one or more predetermined events, such as, determining that the weld horn 140 is not perpendicular to the first surface 112 of the first workpiece 110.

Once the software is engaged, at step 310, the processor 260 determines whether the tip 142 of the weld horn 140 is positioned perpendicular to the first surface 112 of the warped workpiece 110.

Where the sequence 300 determines the tip 142 of the weld horn 140 is positioned perpendicular to the first surface 112 of the warped workpiece 110 (e.g., path 312), the processor 260, at step 350, executes instructions that cause the weld horn 140 to join at least a portion of the workpieces 110, 120.

Where the tip 142 of the weld horn 140 is not positioned perpendicular to the first surface 112 of the warped workpiece 110, for embodiments using the example positioning device 170 (FIG. 2) to position the weld horn 140 (e.g., path 314), flow proceeds to step 330 whereat the positioning device 170 self aligns to position the weld horn 140 to be perpendicular to the first surface 112. More particularly, once the robot 10 is positioned, using the controller 20, to a predetermined location for reforming and/or joining the workpieces 110, 120, the positioning device 170, using mechanical components, without the use of additional instruction from the controller 20, allows adjustment of an orientation of the weld horn 140 until it is generally perpendicular to the first surface 122 of the joining workpiece 120.

At step 330, positioning of the weld horn 140 using the positioning device 170 can include adjustment of the positioning device 170 itself such as the faceplate 172 or adjustment of components associated with the robot 10 such as the platform 12. For example, the faceplate 172 can, using mechanical components translate about one or more axes and/or rotate about one or more axes to properly position the weld horn 140 perpendicular to the warped workpiece 110.

Where the tip 142 of the weld horn 140 is not positioned perpendicular to the first surface 112 of the warped workpiece 110, and a scanning alignment device such as the camera 150 and the laser generator 160 are being used to position the weld horn 140 (e.g., path 316), the sequence 300 can optionally, after step 310, scan the first surface 112 of the warped workpiece 110 at step 320. The controller 20 in some embodiments determines that one or more scanning alignment devices are present or being used by identifying the presence of instrumentation such as the beam generator 160 and the camera 150 communicating through the I/O ports 270, for example.

At step 320, as discussed in association with FIG. 1, scanning occurs by the laser beam 165 projecting light that reflects off the first surface 112 of the warped workpiece 110 and is communicated to the camera 150 as characteristics data and processed by the controller 20 into the image of the first surface 112 of the warped workpiece 110. The controller 20 interprets the image of the first surface 112 and determines if the weld horn 140 requires adjusting to make the weld horn 140 perpendicular to the warped surface 110.

Once the first surface 112 of the warped workpiece 110 has been scanned, the processor 260, at step 330, executes instructions, based on the image of the first surface 112 to position the weld horn 140 to be generally perpendicular to the first surface 122 of the joining workpiece 120. Positioning of the weld horn 140 using the scanning alignment can include adjustment of the beam generator 160 (and thus the beam 165).

Next, at step 340, the processor 260 determines if a gap (e.g., space 130) is present between the second surface 114 of the warped workpiece and the first surface 122 of the joining workpiece. Presence of the space 130 can prevent formation of a preferred or ideal weld joining the workpieces 110, 120.

Presence of the space 130 can be determined by any number of methods and procedures including, but not limited to, visual inspection of the system 100 by a human operator or calculations using data derived from a visualization device (e.g., camera) or object detection system (e.g., radar).

For example, the controller 20 may contain settings (e.g., within its memory 210) that define a predetermined distance at which the tip 142 of the weld horn 140 should come into contact with the first surface 112 of the warped workpiece 110. If, upon initial positioning of the weld horn 140 (e.g., at position 101 of FIGS. 1 and 2) and/or aligning of the weld horn 140 (e.g., at position 102 of FIGS. 1 and 2), it is determined that the weld horn 140 reached the first surface 112 before the predetermined distance was reached, or that the weld horn 140 is moved by more than the predetermined distance without contacting the first surface 112. The controller 20 may determine that because the predetermined distance is not reached, or reached prematurely, an unwanted separation (e.g., the space 130) exists between the workpieces 110, 120.

If the space 130 is not present, flow of the sequence flows (e.g., path 342) to step 350 whereat the controller 20 executes instructions causing the weld horn 140 to join at least portion of the workpieces 110, 120.

The ultrasonic vibrations used to join the workpieces 110, 120 are of a frequency fostering generation of heat sufficient to melt material of the warped workpiece 110. A frequency between 10 KHz and 70 KHz can be used to melt the material of the warped workpiece 120, for example.

The low-amplitude, high-frequency vibrations cause deformation of the warped workpiece 110, primarily at or adjacent the joining interface (e.g., faying interfaces and surface asperities). The deformation is converted into heat through intermolecular friction. The heat, highest at the joining interface, is sufficient to melt the warped workpiece 110 and fuse together the workpieces 110, 120.

If the space 130 is determined present, flow of the sequence proceeds (e.g., path 344) to step 360 whereat the controller 20 executes instructions that cause the weld horn 140 to soften and reform at least a portion of the warped workpiece 110, at or near a location of warping/deformity. In some embodiments, the reforming is accomplished by generation of the heat for softening the material and by application of directional forces (step 370). Reforming the warped workpiece 110 reduces, if not completely eliminates, the space 130 between the warped workpiece 110 and the joining workpiece 120. Reforming the warped workpiece 110 involves softening the material of the warped workpiece 110 and allowing the warped workpiece 110 to reform toward a desired shape.

In some embodiments, softening the material of the warped workpiece 110 occurs by heating the material using ultrasonic vibrations. The ultrasonic vibrations are distributed, initially at any number of locations on the first surface 112 of the warped workpiece 110, by the welding horn 140 and cause molecules within the warped workpiece 110 to move and generate heat within the energy transfer area 145. With time, expansion of the energy transfer area 145 occurs through heating of additional molecules of the warped workpiece 110.

The ultrasonic vibrations that cause heating of the warped workpiece 110 can be accomplished by applying relatively low-amplitude, high-frequency mechanical vibrations directed towards the warped workpiece 110. These amplitudes and frequencies can be lower, for instance, than those used for welding. An amplitude between about 1 micrometer (μm) and about 250 μm, and a frequency between about 10 kilohertz (KHz) and about 70 KHz can be used to deform the material of the warped workpiece 110, for example. Amplitudes and frequencies within this range allow repositioning of the material into a position that is desirable for joining (e.g., generally parallel to the joining workpiece 120).

Cooling of softened material within the warped workpiece 110 may occur though heat exchange with the environment (e.g., heat loss to surrounding air), forming a solidified workpiece without warping at the joining interface.

As mentioned, reforming the first surface 112 of the warped workpiece 110 can include, at step 370, application of directional forces, such as by the processor 260 executing instructions that apply directional forces to the workpieces, such as to the first surface 112 of the warped workpiece 110 and the second surface 124 of the joining workpiece 120, thereby pushing the workpieces 110, 120 toward each other. Directional force may be initiated by the controller 20, for example, executing instructions that cause components, such as compression clamps, to apply directional force (e.g., clamping force) to the first surface 112 of the warped workpiece 110 and the second surface 124 of the joining workpiece 120. Applying directional force onto material of the warped workpiece 110, softened or otherwise, can assist in reformation of the warped workpiece 110 to allow the warped workpiece 110 to be positioned generally parallel, or flush, to the joining workpiece 120.

Directional force can be applied at any number of any one or more of a variety of locations on the warped workpiece 110 sufficient to reform the warped workpiece 110. For example, directional force may be applied at a location on the first surface 112 of the warped workpiece 110 whereat warping or deformity was determined present, such by use of the camera. As illustrated at position 103 of FIGS. 1 and 2, directional force (denoted as arrows) can be applied at generally a location were the surface 112 of the warped workpiece 110 begins to deviate from its intended shape, e.g., from being a generally flat surface.

The directional force can also be applied at one or more locations the second surface 124 of the joining workpiece 120. In cases in which one of the workpieces, for example, the joining workpiece 120, is held in place by a static object, such as a worktable, bench, anvil, or floor, the directional force on that workpiece can be received from the static object in response to the directional force received at the object/workpiece interface from the directional force being applied at the other workpiece.

The amount of directional force needed to reform the warped workpiece 110 ranges in various embodiments between about 50 and about 4,000 Newtons (N). Parameters that can affect the amount of force applied can include, for example, any of the thickness of the workpiece, the material of the workpiece, and the temperature at which the workpiece is being reformed. For example, the directional force required to reform the warped workpiece 110 when composed of thermoplastic materials may be between about 50 and about 1,000 N. However, the directional force required to reform the warped workpiece 110 at the same temperature when composed of metal materials may be between about 50 and about 4,000 N.

The amount of directional force required to reform the warped workpiece 110 can be affected by the temperature of the warped workpiece 110 when the directional force is applied. Specifically, the amount of directional force required to reform the warped workpiece 110 decreases as the temperature of the warped workpiece 110 increases. For example, the amount of directional force required to reform the warped workpiece 110 at room temperature is greater than the amount of directional force required to reform the warped workpiece 110 at a temperature greater than room temperature, but less than a recrystallization temperature of the material of the warped workpiece 110.

Where two or more locations of directional force are located on the same surface, the amount of directional force can be allocated equally or unequally amongst the locations. As illustrated in FIGS. 1 and 2, directional force is applied at multiple locations on the first surface 112 of the warped workpiece 110 and the second surface 124 of the joining workpiece 120.

In some embodiments, reforming of the warped workpiece 110 involves applying the directional forces before, during, or after applying energy to soften the material of the warped workpiece 110, as described in association with step 350. In some embodiments, softening the material (e.g., step 360) and applying directional force (e.g., step 370) can be combined into one step or process and executed, more or less, concurrently by the controller 20.

In some embodiments, the controller 20 may include (in the memory 210) one or more settings that regulates the amount ultrasonic energy or directional force applied to the first surface 112 of the warped workpiece 110, at steps 360 and 370 respectively, to a predetermined quantity during each iteration of step 360, as to not over soften or over compress the warped workpiece 110, causing potential failure of the warped workpiece 110. In operation, the controller 20, using the processor 260, would execute instructions to apply the predetermined quantity of ultrasonic energy or directional force to the workpieces 110, 120 before, during, or after softening, to reduce the space 130 present between the workpieces 110, 120.

Next, the sequence 300, after heating and/or compressional force has reformed the warped workpiece 110, reevaluates if the space 130 is still present. If the space is still present, the controller 20 again executes steps 360 and 370.

Once the space 130 has been reduced or eliminated, the workpieces 110, 120 may be joined at step 350. After the workpieces 110, 120 are joined at step 350, the sequence 300, using the controller 20, automatically disengage after the weld is completed at 350 or send a "disengage response mode" message, which ends the sequence 300.

IV. SELECT FEATURES

Many features of the present technology are described herein above. The present section presents in summary some selected features of the present technology. It is to be understood that the present section highlights only a few of the many features of the technology and the following paragraphs are not meant to be limiting.

One benefit of the present technology is the system ensures that the weld horn is positioned generally perpendicular to a workpiece, even when warping or deformity exists within the workpiece. Positioning the weld horn generally perpendicular to the workpiece allows a maximum contact surface area between the weld horn and a first surface of the workpiece for reforming the workpiece.

Another benefit of the present technology is the system allows for the softening and reforming of a warped workpiece prior to joining Reforming a warped workpiece allows the warped workpiece to be generally parallel to the joining workpiece during joining, which produces a weld consistent in size and depth throughout.

Another benefit of the present technology is the system allows adjustment of the weld horn based on warping of different workpieces. Given that each workpiece may not be warped in a similar manner, the system provides a flexible solution for adjusting to different material issues.

Another benefit of the present technology is that proper alignment of the weld horn for welding, in addition to maximizing amount and efficiency of energy transfer to the first workpiece, reduces damage of the weld horn. When the weld horn is not aligned generally perpendicular to the workpiece to be joined, the weld horn is not used in its intended manner, which over time can lead to issues of misalignment and inconsistent weld formation. Proper alignment reduces an amount of maintenance and replacement needed, and so increasing horn life.

V. CONCLUSION

Various embodiments of the present disclosure are disclosed herein. The disclosed embodiments are merely examples, which may be embodied in various and alternative forms, and combinations thereof, set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method, for joining a first workpiece having a deformity to a second workpiece, comprising:
    positioning the first workpiece adjacent the second workpiece such that a first surface of the first workpiece having the deformity is near a tip of a weld horn and a second surface of the first workpiece is adjacent a first surface of the second workpiece;
    softening material of the first workpiece by applying a first predetermined amount of energy from the weld horn to the first surface of the first workpiece at or near the deformity;
    applying, after starting to soften the material of the first workpiece, a force to the first surface of the first workpiece at or near the deformity, causing the first workpiece softened to reform to a position generally parallel with a first surface of the second workpiece, thus reducing a separation space at a joining interface formed by the second surface of the first workpiece and the first surface of the second workpiece; and
    applying a second predetermined amount of energy, being greater than the first predetermined amount of energy, to the first workpiece reformed to form a welding joint at an interface between the first workpiece and the second workpiece.

2. The method of claim 1 wherein applying the first predetermined amount of energy at or near the deformity on the first surface of the first workpiece and reforming material of the first workpiece are repeated until the separation space at the joining interface is substantially reduced or eliminated.

3. The method of claim 1 wherein applying the force at or near the deformity on the first surface of the first workpiece and reforming material of the first workpiece are repeated until the separation space at the joining interface is substantially reduced or eliminated.

4. The method of claim 1 further comprising positioning, adjacent with and generally perpendicular to the first surface of the first workpiece near the deformity, tip of the weld horn configured to soften and melt material of the first workpiece to form a weld.

5. The method of claim 4 wherein the positioning the weld horn comprises translational and rotational positioning of a device connected to the weld horn.

6. The method of claim 4 wherein the positioning comprises projecting light onto the first surface of the first workpiece.

7. The method of claim 6 wherein the positioning further comprises capturing light reflected at the first surface of the first workpiece using a sensory device.

8. A method, for joining a first workpiece having a deformity to a second workpiece, comprising:
    providing the first workpiece and the second workpiece, wherein a second surface of the first workpiece is positioned adjacent a first surface of the second workpiece, forming a joining interface;
    softening material of the first workpiece by applying, a first predetermined amount of energy from a weld horn at or near the deformity;
    applying, after starting to soften the material of the first workpiece, a force to the first surface of the first workpiece and a second surface of the second workpiece, thereby reducing a separation space present at the joining interface due to the deformity; and
    applying a second predetermined amount of energy, being greater than the first predetermined amount of energy, to the first workpiece reformed to form a welding joint at an interface between the first workpiece and the second workpiece.

9. The method of claim 8 wherein applying the force is, in part, generally perpendicular to the first surface of the first workpiece, causing reformation of the first workpiece to a position substantially parallel to the second workpiece.

10. The method of claim 8 wherein applying the first predetermined amount of energy at or near the deformity on the first surface of the first workpiece and reforming material of the first workpiece are repeated until the separation space at the joining interface is substantially reduced or eliminated.

11. The method of claim 8 wherein applying the force at or near the deformity on the first surface of the first workpiece and reforming material of the first workpiece are repeated until the separation space at the joining interface is substantially reduced or eliminated.

12. The method of claim 8 further comprising positioning, adjacent with and generally perpendicular to the first surface of the first workpiece near the deformity, the weld horn configured to soften and melt material of the first workpiece to form a weld.

13. The method of claim 12 wherein the positioning the weld horn comprises translational and rotational positioning of a device connected to the weld horn.

14. The method of claim 12 wherein the positioning comprises projecting light onto the first surface of the first workpiece.

15. The method of claim 14 wherein the positioning further comprises capturing light reflected at the first surface of the first workpiece using a sensory device.

* * * * *